(No Model.)
G. W. SANDERS.
Joint for Doll.
No. 235,300. Patented Dec. 7, 1880.
Fig. 1.　　　Fig. 3.　　　Fig. 2.
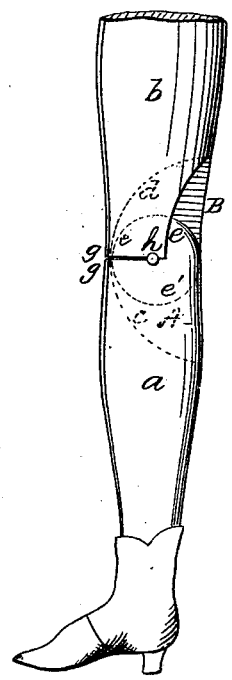
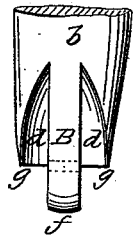
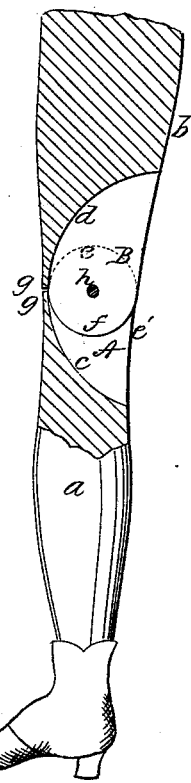
Fig. 4.
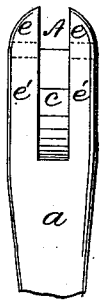
Fig. 5.　　Fig. 6.
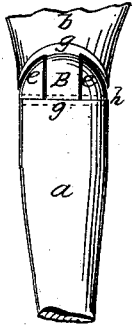
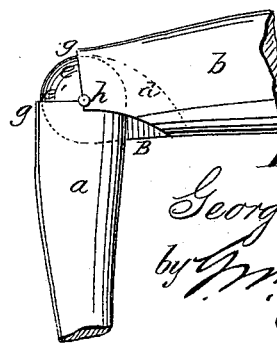
Witnesses:
Chas. Nida
H. L. Wattenberg
Inventor:
George W. Sanders,
by　　　　　　
Attorney.

UNITED STATES PATENT OFFICE.

GEORGE W. SANDERS, OF SPRINGFIELD, VERMONT, ASSIGNOR TO WILLIAM H. H. SLACK, OF SAME PLACE.

JOINT FOR DOLLS.

SPECIFICATION forming part of Letters Patent No. 235,300, dated December 7, 1880.

Application filed November 1, 1880. (No model.)

*To all whom it may concern:*

Be it known that I, GEORGE W. SANDERS, of Springfield, in the county of Windsor and State of Vermont, have invented a new and Improved Joint for Dolls; and I do declare that the following is a full, clear, and exact description of the same, reference being had to the accompanying drawings, making part of this specification.

This invention is in the nature of an improvement in joints for dolls; and the invention consists in a joint for dolls constructed with a mortise and tenon and recesses and stops, as is more particularly hereinafter described.

In the accompanying sheet of drawings, Figure 1 represents a side view of the leg of a doll provided with my joint; Fig. 2, a part vertical section of same; Fig. 3, a detail view of tenon portion of joint; Fig. 4, detail view of that part of joint containing mortise; Figs. 5 and 6, front and side views showing the joint applied to the arm of a doll.

Similar letters of reference indicate like parts in the several figures.

It is desirable, in the construction of joints for the legs and arms of dolls, that the joint shall move easily, but yet with sufficient friction to cause it to retain any given position to which it may be adjusted, and at the same time present a smooth and finished appearance, and be provided with a stop that will effectually prevent the joint from being turned in the wrong direction, and thereby break it.

To this end I construct my joint with a mortise, A, formed in one portion of the same, and a tenon, B, formed in the other portion that is to be united by the joint—as, for instance, the elbow-joint of the arm. This mortise and tenon is made on one side only and near the ends of each of the members $a$ and $b$. The base $c$ or terminus of the mortise is curved, as shown in Fig. 2, and on each side of the tenon B curved and semi-cylindrical recesses $d$ are formed.

The outer end, $e$, of the member $a$, in which is cut the mortise A, is hemispherical in form, and the end $f$ of the tenon B is curved, which outer end, $f$, of the tenon, as well as the parts $e'$ on either side of the mortise A, project beyond the outer surfaces of the members $a$ and $b$.

In the members $a$ and $b$ are formed shoulders $g$, to act as stops to prevent the joint from being turned in the wrong direction. When the tenon B is inserted within the mortise A a pin, $h$, passes through the member $a$ and through the tenon B, securing them together.

Now, the operation of the joint constructed substantially as above described is as follows: When the member $a$ of the arm or leg is turned back it readily moves on the pin $h$, the tenon being received within the mortise more or less as the member $a$ is turned, and the sides $e'$ of the member $a$ being received within the curved and semi-cylindrical recesses $d$ of the member $b$, the hemispherical end $e$ of the member $a$ bearing snugly within said recesses $d$, and the rounded portion $f$ of the tenon B bearing against the curved base $c$ of the mortise A. In this way, the parts being snugly fitted and having corresponding curves, when the member $a$ is moved or caused to assume a given angle to the member $b$, it will retain the position to which it has been adjusted until again moved to another.

The mortise A is to some extent longer than is the end of the tenon B, and so, also, are the curved recesses $d$ longer than the hemispherical ends $e$ of the member $a$. This construction permits the member $a$ to be turned or folded backward to a greater extent than would otherwise be the case.

When the members $a$ and $b$ are in line, or in direct continuation of each other, as shown in Figs. 1 and 2, the shoulders $g$ are closely in contact, acting as stops, preventing thereby the members from being folded in a forward direction, which would be unnatural and would destroy the joint.

It is obvious that this joint is equally applicable to either the elbow or knee joint of a doll, and that it is particularly strong, not liable to work loose, close-fitting, and durable, besides making a perfectly natural folding of the members to which it is attached, and, in addition, it leaves the front surfaces of the members smooth and unbroken.

Having thus described my invention, what I claim as new, and desire to secure by Letters Patent, is—

A joint for dolls having a tenon, B, with curved end $f$, recesses $d$, and stop $g$, formed in one member, in combination with a mortise, A, curved base $c$, hemispherical parts $e$, and stop $g$, formed in the other member, substantially as and for the purpose described.

GEORGE W. SANDERS.

Witnesses:
 JEROME W. PIERCE,
 SAMUEL L. CHAPMAN.